Patented July 14, 1942

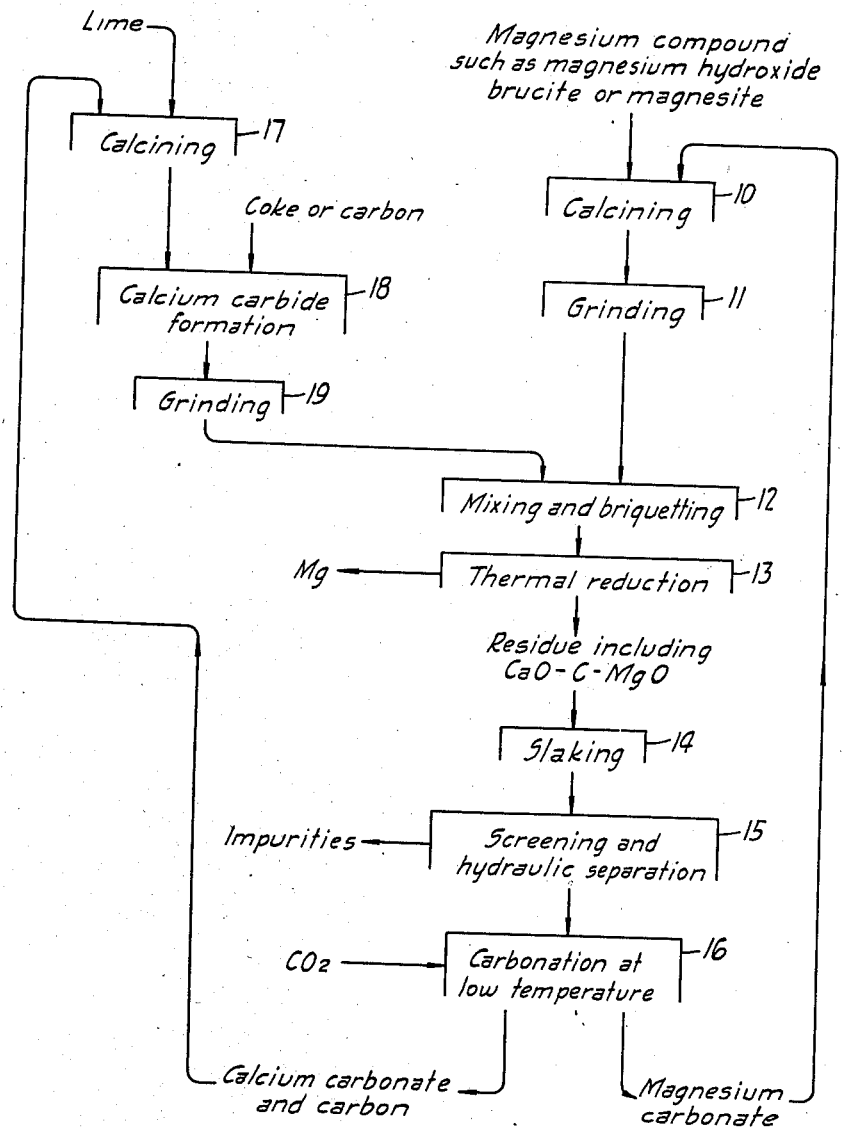

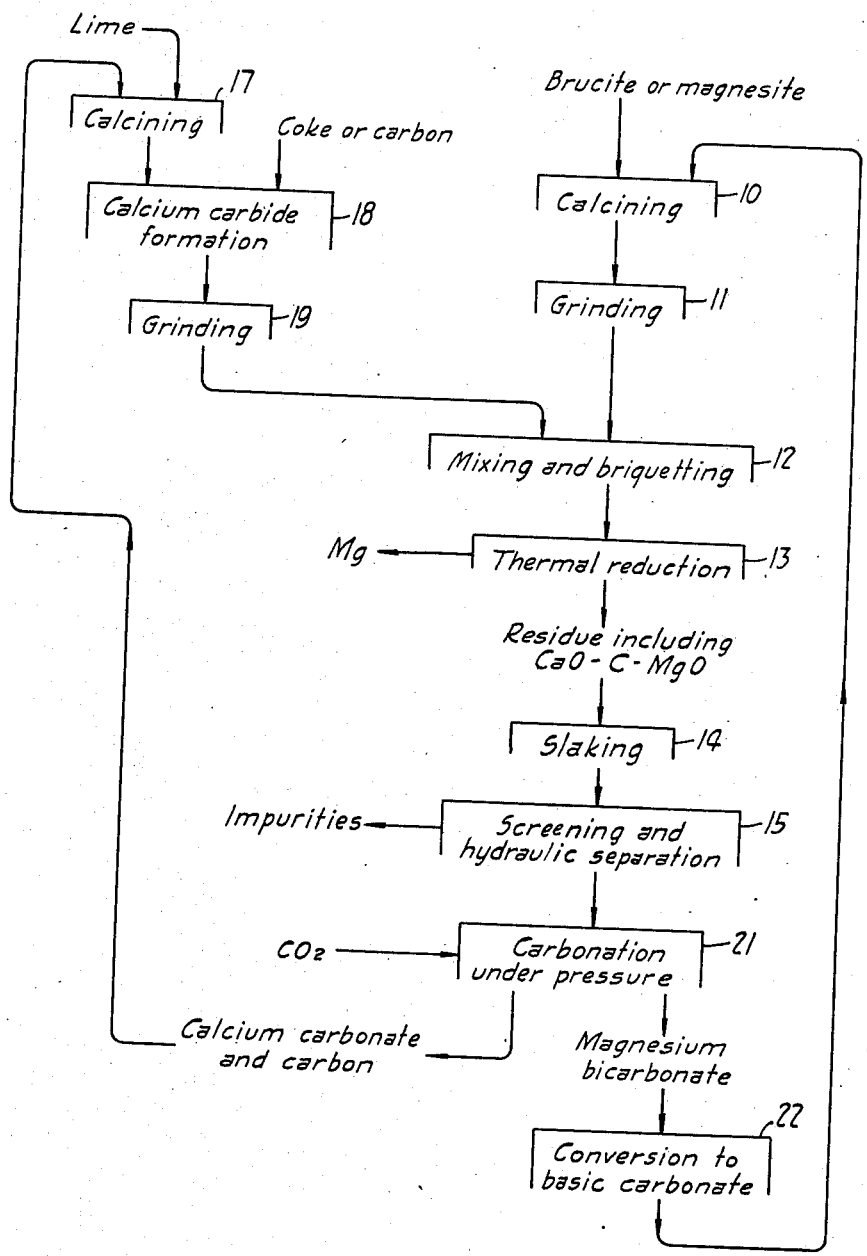

2,289,627

UNITED STATES PATENT OFFICE 2,289,627

MANUFACTURE OF MAGNESIUM

Neil R. Collins, Los Altos, and Gunter H. Gloss, Belmont, Calif., assignors to Marine Magnesium Products Corporation, South San Francisco, Calif., a corporation of Delaware Application March 28, 1941, Serial No. 385,652

8 Claims. (Cl. 75—67)

This invention relates generally to the manufacture of metallic magnesium by thermal reduction of magnesium compounds such as magnesium oxide. More particularly, the invention relates to processes making use of thermal reduction of magnesium oxide with calcium carbide.

It is an object of the invention to provide an economical process for the manufacture of metallic magnesium from various sources of magnesium compounds available, such as brucite, magnesite, or other inexpensive sources of magnesium compounds.

A further object of the invention is to provide a process making possible utilization of the residue after thermal reduction of magnesium oxide with the calcium carbide.

Additional objects of the invention will appear from the following description in which the preferred embodiments have been set forth in detail in conjunction with the accompanying drawings.

Referring to the drawings:

Figure 1 is a flow sheet illustrating one embodiment of the invention; and

Figure 2 is a flow sheet illustrating a second embodiment.

In the past it has been known that magnesium oxide can be reduced with calcium carbide for the production of metallic magnesium. Such a process has the advantage that the magnesium vapor evolved can be directly condensed as a relatively pure metal. It has the disadvantage that a relatively large residue is obtained after the thermal reduction operation which contains end products such as calcium oxide and carbon, together with amounts of unreacted calcium carbide and magnesium oxide depending upon the efficiency of the reaction. If this residue is wasted, it adds considerably to the cost of manufacture of the metallic magnesium. The present invention utilizes part or all of this residue back in the process.

Referring first to Figure 1, the process has been illustrated as utilizing a suitable magnesium compound, such as a magnesium hydroxide, natural brucite, or magnesite. This material is subjected to the calcining operation 10, after which calcined material is subjected to grinding 11. The ground material is then intermixed with ground calcium carbide in suitable proportions, and the mixture is then compressed into pellets or briquets, as indicated at 12. These briquets are then charged in a suitable retort for the thermal reduction operation 13. Thermal reduction of the charge is carried out at temperatures such as from 1050 to 1115° C., under a high vacuum such as 0.2 to 10 mm. of mercury. Where graphite or carborundum retorts are employed, one may use higher temperatures and pressures, as understood in the art. Suitable equipment for this purpose is known and need not be described in detail. Briefly, the equipment includes a suitable furnace for heating the retort, together with means in conjunction with the retort for condensing the evolved magnesium vapor.

The character of the residue left after thermal reduction is dependent somewhat upon the ratio in which the ingredients are intermixed, and the efficiency of the reaction. In a typical instance, the residue will consist of considerable amounts of calcium oxide and carbon, which are end products of the reaction, together with some unreacted calcium carbide and magnesium oxide. To utilize this residue, it is subjected to slaking 14, at a suitable temperature, such as 90 to 100° C., after which the resulting slurry is subjected to the screening and hydraulic separating operation 15. This operation is for the purpose of removing oversized impurities and relatively heavy solid impurities such as calcium silicate. It is desirable to effect removal of such impurities in order to prevent the building up of impurities in the process. The purified slurry from 15 is then subjected to separating treatment for the separate recovery of calcium and magnesium compounds. In Figure 1, the first step of this separating treatment is carbonation at a relatively low temperature as indicated at 16, which involves contact of the slurry with carbon dioxide at temperatures such as from 16 to 18° C., whereby solid phase calcium and magnesium carbonates are produced. The carbon dioxide is preferably supplied with another inert gas, such as air or flue gases. Such a carbon dioxide carrying gas should have a relatively small content of carbon dioxide, as for example about 10% by volume. The magnesium carbonate is formed of particles relatively larger than the particles of calcium carbonate, and therefore the desired separation can be carried out by screening. The carbon present in the slurry being carbonated is in relatively finely divided form, and passes out with the calcium carbonate. This mixture is then utilized, as indicated, for the manufacture of calcium carbide for further use in the process. Thus, the mixture of calcium carbonate and carbon is shown being supplied to the calcining operation 17, in which it is desirable to burn the carbon content to supply part or all of the necessary heat for calcining. The resulting calcium oxide is supplied to the operation 18, where it is reacted with coke or carbon for the manufacture of calcium carbide. This calcium carbide is then shown being subjected to grinding 19 to supply the ground material for the mixing and briquetting operation 12. To take care of loss of calcium in the system, small additional amounts of lime can be supplied to the calcining operation 17, either continuously or intermittently.

The magnesium carbonate produced can be treated as a separate valuable by-product, or it can be returned to the process. It is shown being returned to the calcining operation 10 to merge with the material entering the process.

It will be evident that the process described above makes possible the manufacture of metallic magnesium from relatively inexpensive sources of magnesium compounds, such as brucite or magnesite, without utilizing large amounts of lime. In many instances this will effect a substantial saving in the cost of manufacture of the metallic magnesium, because in localities where brucite or magnesite may be available at low cost, lime may be relatively expensive.

The process of Figure 2 is similar to Figure 1 except that a difference in procedure is employed for carrying out a separating operation upon the residue. Thus, in this instance after the residue has been subjected to slaking 14 and screening and hydraulic separation 15, it is subjected to carbonation under pressure (greater than atmospheric) at 21, which, as is known to those skilled in the art, produces solid phase calcium carbonate and magnesium bicarbonate in solution. The calcium carbonate is separated from the bicarbonate solution by suitable means such as filtration or decantation. The carbon passes out with the calcium carbonate. The calcium carbonate and carbon are shown being supplied to the calcining operation 17, as in Figure 1. The magnesium bicarbonate solution can be converted to basic magnesium carbonate at stage 22, as by releasing the pressure upon the same and heating it to an elevated temperature, and this material can then be treated as a valuable by-product of the process, or as indicated it can be returned to the calcining operation 10 for re-use in the process.

We claim:

1. In a process for the manufacture of magnesium, effecting thermal reduction of magnesium oxide with calcium carbide, separating out the calcium and carbon contents from the residue of the reaction, and utilizing said separated calcium and carbon contents for the manufacture of calcium carbide for further cyclic use in the process.

2. In a process for the manufacture of magnesium, effecting thermal reduction of magnesium oxide with calcium carbide, removing impurities from the residue, effecting a separation of calcium and carbon contents from the residue, and utilizing such separated calcium and carbon contents for forming calcium carbide for further cyclic use in the process.

3. In a process for the manufacture of magnesium, effecting thermal reduction of magnesium oxide with calcium carbide, effecting a separation between the calcium and magnesium contents of the residue to yield calcium and magnesium compounds, and reusing said calcium and magnesium compounds in the process.

4. In a process for the manufacture of magnesium, effecting thermal reduction of magnesium oxide with calcium carbide, effecting a separation upon the residue of the reaction to yield separate calcium and magnesium compounds, utilizing the calcium compound for manufacture of calcium carbide for further cyclic use in the process, and utilizing the magnesium compound for supplying supplemental magnesium oxide for use in the thermal reduction operation.

5. In a process for the manufacture of magnesium, effecting thermal reduction of magnesium oxide with calcium carbide, slaking the residue, removing impurities from the slaked material, effecting a separation upon the slaked material to yield separate calcium and magnesium compounds with separation of the carbon content together with the calcium carbonate, and utilizing the separated calcium compound and carbon for the manufacture of calcium carbide for further cyclic use in the process.

6. In a process for the manufacture of magnesium, effecting thermal reduction of magnesium oxide with calcium carbide, slaking the residue of the reaction, removing impurities from the slaked material, effecting a separation upon the slaked material to yield separate calcium and magnesium compounds, the carbon content of the residue being separated out with the calcium compound, utilizing the carbon separated with the calcium compound for calcining the calcium compound to form calcium oxide, utilizing the calcium oxide thus obtained for the manufacture of calcium carbide for further cyclic use in the process, and utilizing the separated magnesium compound for supplying magnesium oxide for further cyclic use in the process.

7. In a process for the manufacture of magnesium, effecting thermal reduction of magnesium oxide with calcium carbide, effecting a separation between the calcium and magnesium contents of the residue to yield calcium and magnesium compounds, and reusing said calcium compound for forming calcium carbide for further cyclic use in the process.

8. In a process for the manufacture of magnesium, effecting thermal reduction of magnesium oxide with calcium carbide to yield a residue having both calcium and magnesium contents, removing a substantial part of the residual magnesium content from the residue, and then reusing the remaining part of the residue in the process.

NEIL R. COLLINS.
GUNTER H. GLOSS.